US012770169B2

(12) United States Patent
Aidan

(10) Patent No.: US 12,770,169 B2
(45) Date of Patent: Oct. 20, 2026

(54) INTELLIGENT BEAUTY PRODUCT PACKAGING SYSTEM

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 1 day.

(21) Appl. No.: 18/775,930

(22) Filed: Jul. 17, 2024

(65) Prior Publication Data

US 2026/0024118 A1 Jan. 22, 2026

(51) Int. Cl.
*G06Q 30/02* (2023.01)

(52) U.S. Cl.
CPC ................................ *G06Q 30/0281* (2013.01)

(58) Field of Classification Search
CPC .................................................. G06Q 30/0281
See application file for complete search history.

(56) References Cited

U.S. PATENT DOCUMENTS

2003/0065578 A1* 4/2003 Peyrelevade ........... G06T 11/00 705/26.7
2015/0021356 A1* 1/2015 Witchell ............... B01F 33/848 222/23
2017/0024589 A1* 1/2017 Schumacher ...... G06Q 30/0621
2020/0143316 A1* 5/2020 Anido .................. G06Q 10/087
2020/0387942 A1* 12/2020 Kreuzer ................ H04L 67/306

* cited by examiner

*Primary Examiner* — Azam A Ansari
(74) *Attorney, Agent, or Firm* — MARSHALL, GERSTEIN & BORUN LLP

(57) ABSTRACT

An intelligent beauty product packaging system includes a container that contains a beauty product and that has a sensor to detect beauty product usage, a processor, and a memory that stores non-transitory computer-readable instructions. The non-transitory computer-readable instructions, when executed by the processor, cause the processor to: receive beauty product usage information from the sensor; store the beauty product usage information in the memory; analyze the beauty product usage information; and generate a user communication based on the analysis of the beauty product usage information.

30 Claims, 8 Drawing Sheets

INTELLIGENT BEAUTY PRODUCT PACKAGING SYSTEM

FIELD OF THE DISCLOSURE

The present disclosure generally relates to the field of beauty products and, more particularly, to intelligent beauty product packaging systems and method of operating an intelligent beauty product packaging system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The use of cosmetics and skincare products often requires adherence to specific schedules and quantity guidelines to achieve optimal results. Incorrect usage, potential product interactions, and non-adherence to schedules can hinder the effectiveness of these products. While there are some standalone systems in place for reminding users to use their products, these systems lack the ability to interact with the product's packaging, rendering them less effective. Furthermore, individuals with memory issues may struggle to remember whether they have used a particular cosmetic or skincare product.

Accordingly, there is a need for improved beauty product packaging systems having more integrated and intelligent systems for managing product usage.

SUMMARY

Examples within the scope of the present disclosure are directed to intelligent beauty product packaging systems, computer-implemented methods for operating an intelligent beauty product packaging system, and non-transitory computer-readable medium storing instructions for operating an intelligent beauty product packaging system.

In a first example intelligent beauty product packing system, the intelligent beauty product packing system may include a container that contains a beauty product and that comprises one or more sensors, one or more processors communicatively coupled to the one or more sensors, and one or more memories communicatively coupled to the one or more processors. The one or more sensors are configured to detect beauty product usage and the one or more memories store non-transitory computer-readable instructions that, when executed by the one or more processors, cause the one or more processors to: receive beauty product usage information from the one or more sensors based on the beauty product usage detected by the one or more sensors; store the beauty product usage information in the one or more memories; analyze the beauty product usage information; and generate a user communication based on the analysis of the beauty product usage information.

In some examples, the container comprises a user interface and the non-transitory computer-readable instructions, when executed by the one or more processors, cause the one or more processors to deliver the user communication to a user via the user interface.

In some examples, the beauty product usage detected by the one or more sensors includes at least one of an amount of the beauty product used and/or a number of times the beauty product has been used and the analysis of the beauty product usage information includes determining a quantity of the beauty product remaining in the container.

In some examples, the user communication includes a message that the quantity of the beauty product remaining in the container is less than a predetermined quantity.

In some examples, the container comprises a wireless transceiver communicatively coupled to the one or more processors.

In some examples, the wireless transceiver is configured to communicate with a smart device external to the intelligent beauty product packaging system and the non-transitory computer-readable instructions, when executed by the one or more processors, cause the one or more processors to synchronize information between the intelligent beauty product packaging system and the smart device.

In some examples, the non-transitory computer-readable instructions, when executed by the one or more processors, cause the one or more processors to send the user communication to the smart device.

In some examples, the wireless transceiver is configured to communicate with a second intelligent beauty product packaging system and the non-transitory computer-readable instructions, when executed by the one or more processors, cause the one or more processors to send first beauty product information regarding the beauty product to the second intelligent beauty product packaging system and receive second beauty product information from the second intelligent beauty product packaging system.

In some examples, the one or more memories store an interaction database and the non-transitory computer-readable instructions, when executed by the one or more processors, cause the one or more processors to compare the second beauty product information to the interaction database and generate an interaction alert if it is determined that there is a potential adverse reaction between the beauty product in the intelligent beauty product packaging system and in the second intelligent beauty product packaging system.

In some examples, the container comprises a user interface and the non-transitory computer-readable instructions, when executed by the one or more processors, cause the one or more processors to deliver the interaction alert to a user via the user interface.

In some examples, the wireless transceiver is configured to communicate with a smart device external to the intelligent beauty product packaging system and the non-transitory computer-readable instructions, when executed by the one or more processors, cause the one or more processors to send the interaction alert to the smart device.

In some examples, the wireless transceiver is configured to communicate with a computing system external to the intelligent beauty product packaging system.

In some examples, the one or more sensors comprises an environmental sensor and the non-transitory computer-readable instructions, when executed by the one or more processors, cause the one or more processors to receive environmental information from the environmental sensor.

In some examples, the non-transitory computer-readable instructions, when executed by the one or more processors, cause the one or more processors to analyze the environmental information and to generate a user alert if the analysis of the environmental information indicates that the environmental information does not meet predefined storage and/or use conditions.

In some examples, the container comprises a user interface and the non-transitory computer-readable instructions, when executed by the one or more processors, cause the one or more processors to deliver a user alert to the user via the user interface.

In some examples, the non-transitory computer-readable instructions, when executed by the one or more processors, cause the one or more processors to generate a user reminder based on a usage schedule and the analysis of the beauty product usage information.

In some examples, the container comprises a user interface and the non-transitory computer-readable instructions, when executed by the one or more processors, cause the one or more processors to deliver the user reminder to a user via the user interface.

In some examples, the non-transitory computer-readable instructions, when executed by the one or more processors, further cause the one or more processors to provide one or more user instructions, guidance, support, and/or tutorials associated with the beauty product and/or the intelligent beauty product packaging system via a user interface of the container or via a smart device external to the container.

In a second example intelligent beauty product packaging system, the intelligent beauty product packaging system may include a container containing a beauty product and a smart device application configured to be executed by one or more processors of a smart device. The container comprises one or more sensors configured to detect beauty product usage and a wireless transceiver configured to communicate with the smart device, which is external to the container. The smart device application stores non-transitory computer-readable instructions in one or more memories of the smart device that, when executed by the one or more processors, cause the one or more processors to: receive beauty product usage information detected by the one or more sensors from the wireless transceiver of the container; store the beauty product usage information in the one or more memories of the smart device; analyze the beauty product usage information; and generate a user communication based on the analysis of the beauty product usage information.

In some examples, the non-transitory computer-readable instructions, when executed by the one or more processors, cause the one or more processors to display the user communication on a display of the smart device.

In some examples, the beauty product usage detected by the one or more sensors includes at least one of an amount of the beauty product used and/or a number of times the beauty product has been used and the analysis of the beauty product usage information includes determining a quantity of the beauty product remaining in the container.

In some examples, the user communication includes a message that the quantity of the beauty product remaining in the container is less than a predetermined quantity.

In some examples, the smart device application is configured to communicate with a second intelligent beauty product packaging system and the non-transitory computer-readable instructions, when executed by the one or more processors, cause the one or more processors receive second beauty product information from the second intelligent beauty product packaging system.

In some examples, the non-transitory computer-readable instructions, when executed by the one or more processors, cause the one or more processors to compare the second beauty product information to an interaction database and generate an interaction alert if it is determined that there is a potential adverse reaction between the beauty product in the intelligent beauty product packaging system and the second intelligent beauty product packaging system.

In some examples, the smart device application is configured to communicate with a computing system external to the intelligent beauty product packaging system.

In some examples, the one or more sensors comprises an environmental sensor configured to detect environmental information.

In some examples, the non-transitory computer-readable instructions, when executed by the one or more processors, cause the one or more processors to analyze the environmental information and to generate a user alert if the analysis of the environmental information indicates that the environmental information does not meet predefined storage and/or use conditions.

In some examples, the non-transitory computer-readable instructions, when executed by the one or more processors, cause the one or more processors to generate a user reminder based on a usage schedule and the analysis of the beauty product usage information.

In some examples, the non-transitory computer-readable instructions, when executed by the one or more processors, cause the one or more processors to provide one or more user instructions, guidance, support, and/or tutorials associated with the beauty product and/or the intelligent beauty product packaging system via a user interface of the smart device.

In an example computer-implemented method for operating an intelligent beauty product packaging system, beauty product usage information detected by one or more sensors in a container of the intelligent beauty product packaging system is received by one or more processors, the beauty product usage information is stored in one or more memories and is analyzed by the one or more processors, and a user communication is generated by the one or more processors based on the analysis of the beauty product usage information.

In an example non-transitory computer-readable medium storing instructions for operating an intelligent beauty product packaging system, the instructions, when executed by one or more processors, cause the one or more processors to receive beauty product usage information detected by one or more sensors in a container of the intelligent beauty product packaging system, store the beauty product usage information in one or more memories, analyze the beauty product usage information, and generate a user communication based on the analysis of the beauty product usage information.

BRIEF DESCRIPTION OF THE DRAWINGS

The above needs are at least partially met through provision of one, more than one, or any combination of the intelligent beauty product packaging systems and methods of operating an intelligent beauty product packaging system described in the following detailed description, particularly when studied in conjunction with the drawings, wherein.

Figure 1A:
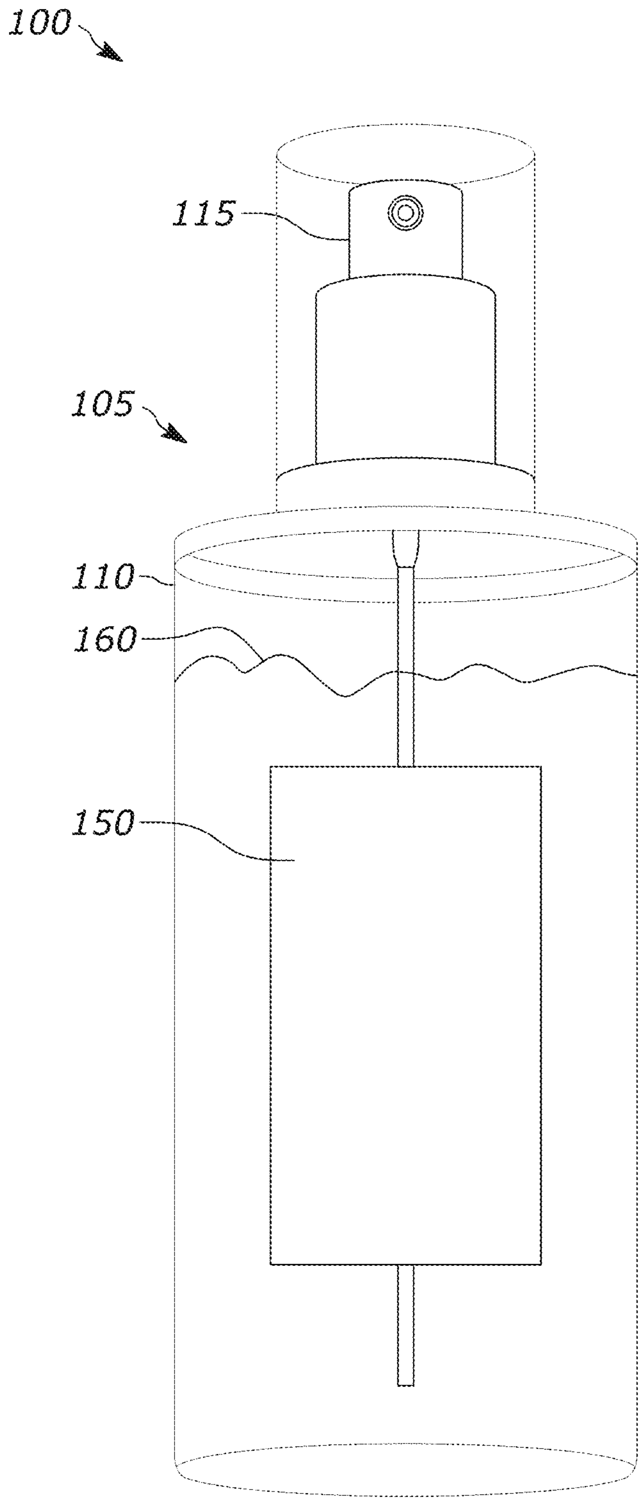
FIGS. 1A-1D illustrate front plan views of example intelligent beauty product packaging systems.
Figure 1B:
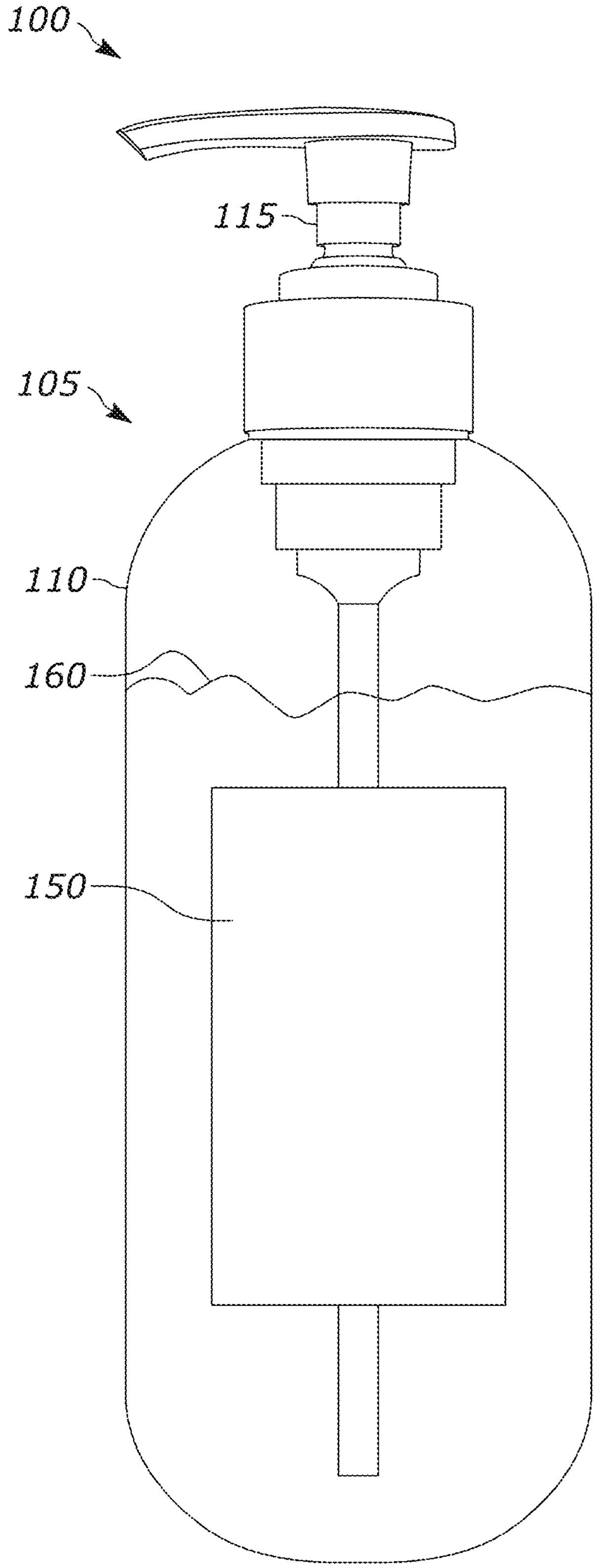
Figure 1C:
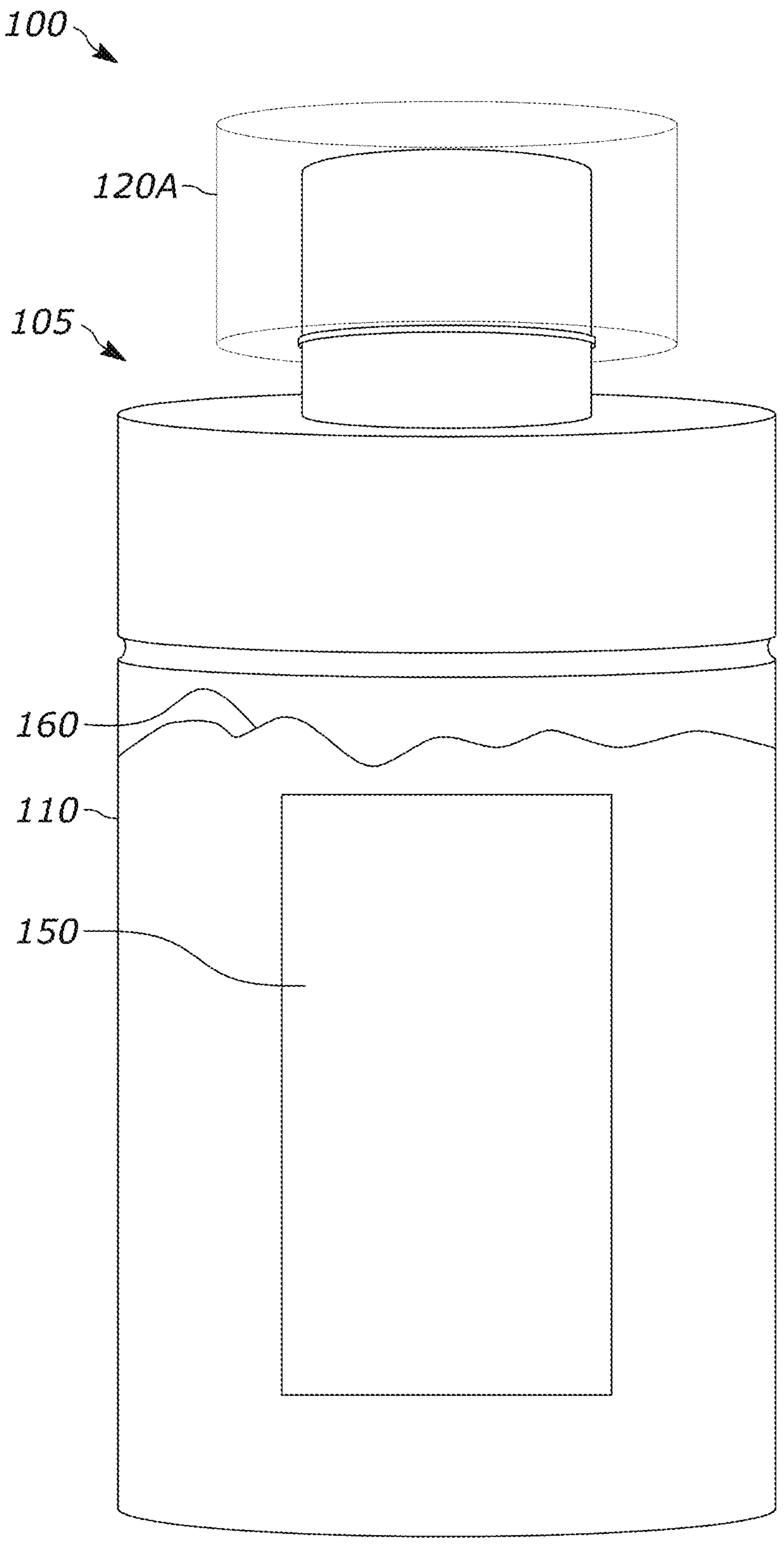
Figure 1D:
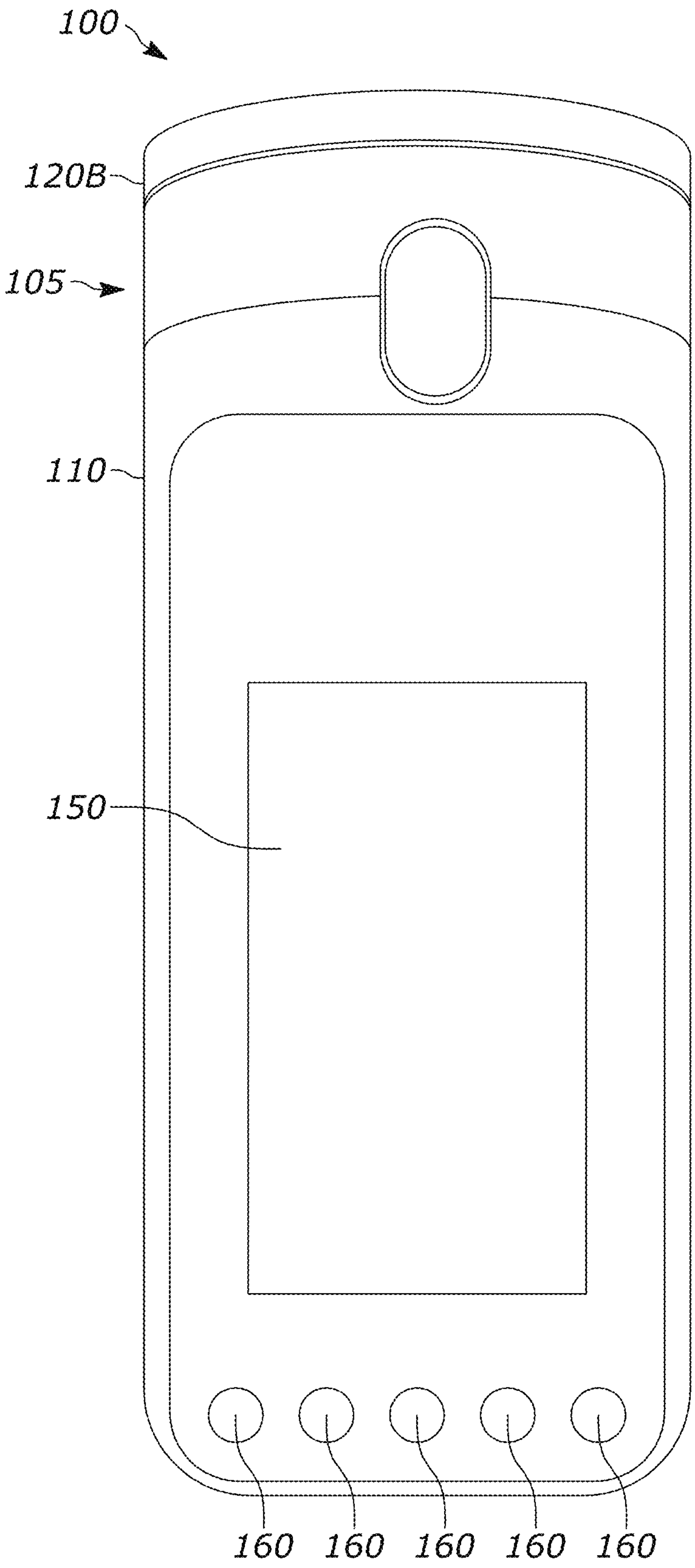

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, the present disclosure provides an intelligent beauty product packaging system with advanced technological features for managing the usage of cosmetics and skincare products. The intelligent beauty product packaging systems and methods described herein can interact with users, monitor the use of a beauty product, provide usage recommendations, provide usage reminders, provide possible interaction warnings, synchronize information with other intelligent beauty product packaging systems, send and receive information from external computing systems, etc.

The intelligent beauty product packaging systems and methods disclosed herein leverage Internet of Things (IoT) technology, artificial intelligence (AI), machine learning (ML), and data analytics and can record and process beauty product usage information, issue warnings about potential product interactions, provide usage recommendations based on user patterns or cosmetic profiles, and can interface with other intelligent beauty product packaging systems, smart devices, and/or external computing system for comprehensive beauty product management. This intelligent beauty product packaging systems disclosed herein can increase the safety, efficiency, and user-friendliness of using cosmetics and skincare products.

The intelligent beauty product packaging systems and methods disclosed herein can effectively monitor and manage the usage of cosmetics and skincare products, which could lead to improved adherence to product usage guidelines, prevention of negative product interactions, and ultimately, better health and skincare outcomes. The intelligent beauty product packaging systems can offer various features, including personalized usage recommendations based on AI/ML algorithms and user data, integration with a user's digital health record for tailored advice, multi-user support for shared use, and automatic product refill alerts, etc. The intelligent beauty product packaging systems can also include a locking mechanism that can restrict and control access to the cosmetic or skin care product.

The intelligent beauty product packaging systems disclosed herein provide user-friendly interfaces, be it through a user interface on a container of the intelligent beauty product packaging system, a mobile application, or other smart devices, for efficient user interaction. The intelligent beauty product packaging systems can also function in an offline mode, ensuring that product usage continues to be tracked even in the absence of internet connectivity.

The intelligent beauty product packaging systems disclosed herein can also interface with a user's digital health record, other databases, and a remote third-party, such as a healthcare provider or family member, providing a seamless and comprehensive beauty product usage management solution. This can address several challenges associated with the usage of cosmetics and skincare products, including adherence to schedules, quantity control, and potential product interactions.

The intelligent beauty product packaging systems disclosed herein can be used by a single user or by multiple users, each with individual profiles and usage tracking, allowing shared use while maintaining personalized monitoring, alerts, and recommendations. The intelligent beauty product packaging systems can be configured to receive and differentiate inputs from multiple users, store user settings (e.g., alert tones, notification preferences, language, etc.) for multiple users, and display/communicate personalized data and notifications based on active user profile settings. They can also be configured for multilingual usage and can have a physical or digital user manual providing instructions, troubleshooting steps, feature details, etc.

The intelligent beauty product packaging systems disclosed herein can also be configured to receive user feedback, allowing users to provide information on product, side effects, or other comments, which can contribute to better personalized beauty product usage recommendations. The intelligent beauty product packaging systems can use AI/ML algorithms to analyze and improve accuracy and effectiveness of usage recommendations and interaction warnings and accuracy and timing of user reminders based on user feedback and usage data.

The intelligent beauty product packaging systems disclosed herein can support sustainability, since one container can be reused and refilled, rather than providing a beauty product in a single use, disposable container. The system can assist in controlling the timing of the use of a beauty product, for example, by providing reminders when to use a beauty product and preventing use of the beauty product if a predetermined time has not been reached. The system can also allow communications between multiple containers and/or smart devices to monitor for and provide warnings about potential adverse beauty product interactions.

Referring to FIGS. 1A-1D, first example intelligent beauty product packaging systems 100 are illustrated, according to some implementations. As discussed in greater detail below, intelligent beauty product packaging systems 100 can include one or more sensors configured to capture beauty product usage information and a user interface configured to provide user communications to the user based on the beauty product usage information captured by the sensor(s).

Intelligent beauty product packaging system 100 includes a container 105 that is configured to contain a beauty product 160, which can be any type of cosmetic and/or skin care product that is designed to enhance or care for a user's appearance, including makeup, skincare creams, lotions, and other related items. Container 105 can include a housing 110 to store beauty product 160 and a dispenser 115 (e.g., an aerosol dispenser (FIG. 1A), a pump dispenser (FIG. 1B), etc.) or applicator to dispense or apply beauty product 160 and/or a lid (e.g., lid 120A (FIG. 1C), lid 120B (FIG. 1D), etc.) to contain beauty product 160 within housing 110.

Container 105 can be compatible with various different types of beauty products, such as liquids, creams, gels, sprays, beads, etc. In some implementations, container 105 can also include a user interface 150, which can be attached to or integrated into housing 110, lid 120A, 120B, and/or dispenser 115. User interface 150 can be a visual display device and/or an audio device (e.g., a speaker) and can also include an input device (e.g., a touch screen, buttons, etc.). User interface 150 may be configured to receive inputs from the user of intelligent beauty product packaging system 100, and/or to provide audible or visual feedback to the user, including instructions, guidance, tutorials, etc. For example, user interface 150 can provide a visual display and/or audio feedback to the user that includes product information for beauty product 160, the number of times intelligent beauty product packaging system 100 has been used, a schedule for the use/application of beauty product 160 (e.g., when beauty product 160 should be used/applied, the last time beauty product 160 was used/applied, the next time beauty product 160 should be used/applied, etc.), an amount of beauty product 160 used, an amount of beauty product 160 remaining in housing 110, a suggested refill/reorder time for beauty product 160, product/system use instructions, etc. Other visual and/or audio indications are also possible.

Figure 2:
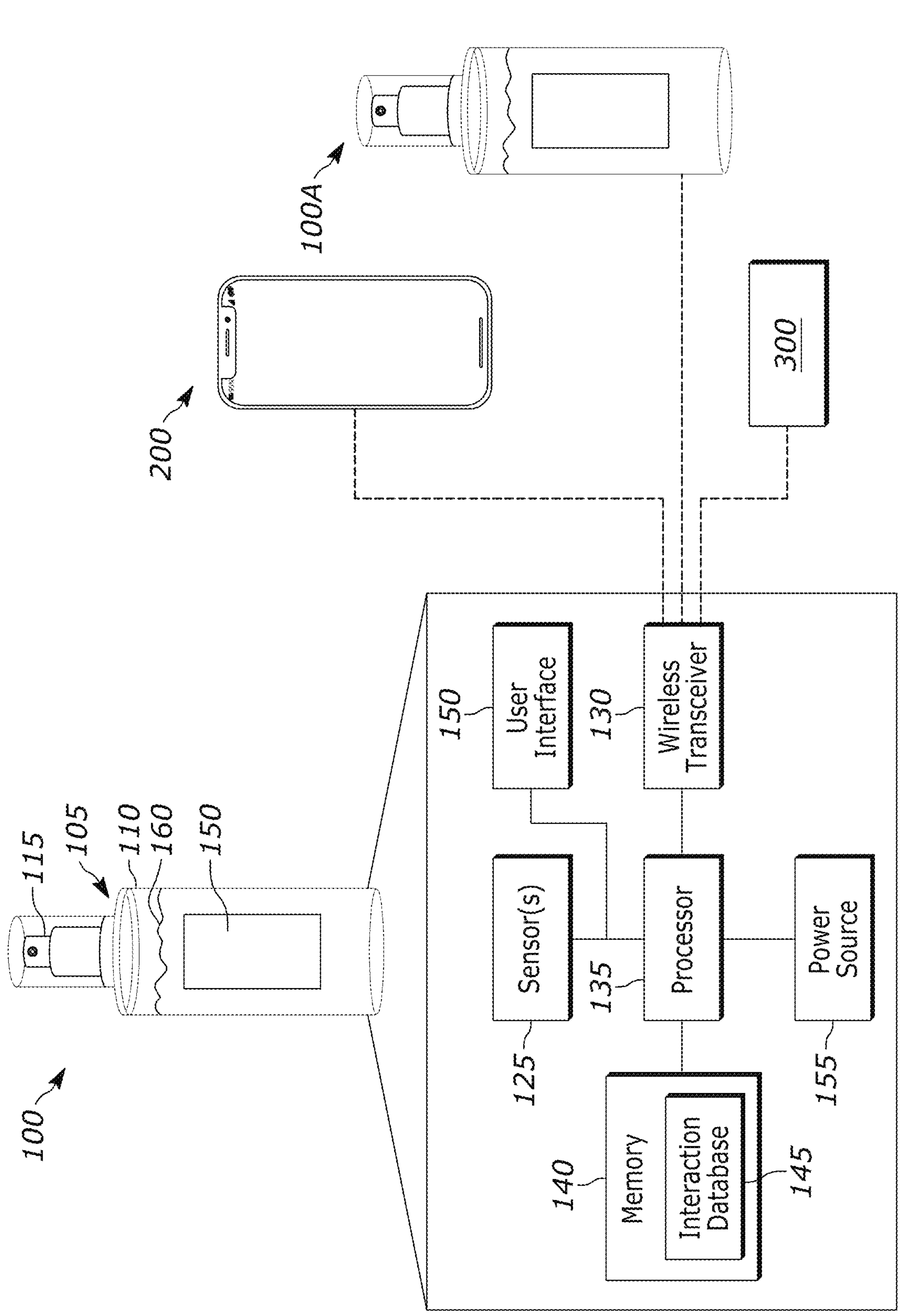
FIG. 2 illustrates a schematic view of the example intelligent beauty product packaging systems of FIGS. 1A-1D.

Referring to FIG. 2, a schematic view of intelligent beauty product packaging system 100 is illustrated, according to one implementation. The high-level architecture illustrated in FIG. 2 may include both hardware and software applications, as well as various data communications channels for communicating data between the various hardware and software components, as is described below.

Container 105 of intelligent beauty product packaging system 100 can generally include one or more sensors 125, one or more processors 135 communicatively coupled (e.g., via a wired or wireless connection) to sensor(s) 125, and one or more memories 140 communicatively coupled (e.g., via a wired or wireless connection) to processor(s) 135. Container 105 can also include user interface 150, a power source 155 (e.g., a battery), and a wireless transceiver 130, as discussed in more detail below.

Sensor(s) 125 can be configured to detect beauty product usage, for example, when beauty product 160 is used, an amount of beauty product 160 used, a number of times beauty product 160 has been used, etc. In some implementations, sensor(s) 125 can detect the opening/closing of lid 120A, 120B, the dispensing of beauty product 160 (e.g., via dispenser 115), a quantity of remaining beauty product 160 in housing 110, a time beauty product 160 was accessed/dispensed/used, etc. Other beauty product usages can also be detected by sensor(s) 125. Sensor(s) 125 can be a reed switch (e.g., to detect when the lid is opened/closed, when a pump or aerosol nozzle is depressed, etc.), a flow sensor (e.g., to detect a quantity of beauty product used and a time used), a hall effect sensor, a float switch (e.g., to detect an amount of beauty product left in the housing of the container), a gas sensor (e.g., to detect oxidation), a load cell (in the container or external of the container) (e.g., to detect when a weight of the container and beauty product has changed), etc. Other types of sensors are also possible, such as environmental sensors (e.g., temperature sensors, pressure sensors, humidity sensors, illumination sensor, etc.).

Wireless transceiver 130 is communicatively coupled (e.g., via a wired or wireless connection) to processor(s) 135. Wireless transceiver 130 can provide wireless communications to/from intelligent beauty product packaging system 100 (e.g., via Bluetooth, WiFi, cellular, Near Field Communications (NFC), etc.) and can include a secure data encryption protocol to ensure data privacy and safety.

One or more memories 140 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others and may store an operating system (OS) (e.g., iOS, Microsoft Windows, Linux, UNIX, etc.) capable of facilitating the functionalities, apps, methods, or other software as discussed herein.

One or more memories 140 store non-transitory computer-readable instructions that, when executed by processor(s) 135, cause processor(s) 135 to receive beauty product usage information from sensor(s) 125 based on the beauty product usage detected by sensor(s) 125, store the beauty product usage information in one or more memories 140, analyze the beauty product usage information, and generate a user communication (e.g., an alert, recommendation, reminder, information, etc.) based on the analysis of the beauty product usage information. In some implementations, the beauty product usage information detected by sensor(s) and received by processor(s) 135 can include a time beauty product 160 was used, an amount of beauty product 160 used, a number of times beauty product 160 and/or intelligent beauty product packaging system 100 has been used, etc. In these implementations, the analysis of the beauty product usage information by processor(s) 135 can include determining when beauty product 160 was used, if/when beauty product 160 should be used again, how much beauty product 160 was used, a quantity of beauty product 160 remaining in housing 110 of container 105, etc. In some implementations, the analysis of the beauty product usage information can forecast depletion of beauty product 160 and/or determine optimal application times for beauty product 160 based on usage patterns determined in the analysis. The user communication generated by processor(s) 135 can include a message indicating when beauty product 160 should be used again, that the quantity of beauty product 160 remaining in container 105 is less than a predetermined quantity, etc. The analysis of the beauty product usage information by processor(s) 135 can also be used to generate summary reports regarding: usage of beauty product 160 and/or intelligent beauty product packaging system 100, patterns of use of beauty product 160 and/or intelligent beauty product packaging system 100, adherence to usage recommendations, product interactions, etc. Predictive analytics can also be generated based on the analysis of the beauty product usage information. Processor(s) 135 can also monitor an expiration date for beauty product 160 and provide an alert when the expiration date is approaching or has passed.

In some implementations, processor(s) 135 can use artificial intelligence (AI) and/or machine learning (ML) algorithms to analyze the beauty product usage information, identify patterns, make predictions, etc. In addition, processor(s) 135 can use edge computing techniques to perform analysis locally on intelligent beauty product packaging system 100, reducing the need for constant network connectivity and enhancing user privacy.

In some implementations, intelligent beauty product packaging system 100 can include a locking mechanism that can prevent activation of dispenser 115 or opening of lid 120A, 120B at predetermined times. The non-transitory computer-readable instructions, when executed by processor(s) 135, can control the locking mechanism and control access to beauty product 160. For example, if beauty product 160 is to be used every four hours, the locking mechanism can be engaged upon a use of beauty product 160 and disengaged four hours after the detected use. Intelligent beauty product packaging system 100 can also alert a user or a remote third-party when the locking mechanism is disengaged and beauty product 160 becomes available for use, thereby reducing the risk of overuse or misuse and improving adherence to a prescribed regimen.

Wireless transceiver 130 can be configured to communicate with a smart device 200 that is external to intelligent beauty product packaging system 100 and one or more memories 140 can include non-transitory computer-readable instructions that, when executed by processor(s) 135, cause processor(s) 135 to synchronize information between intelligent beauty product packaging system 100 and smart device 200 and/or to send the user communication generated by processor(s) 135 to smart device. Smart device 200 can then communicate the user communication to the user (e.g., visually, audibly, etc.). Smart device 200 can be any type of smart device, such as a smart phone, a tablet, a computer, a smart watch or fitness tracker, a virtual reality headset, smart or augmented reality glasses, wearables, etc., and can have a user interface configured to display information based on the communications with intelligent beauty product packaging system 100 (e.g., product usage data, warnings, recommendations, etc.) and/or general information, such as a digital user manual, ingredient list for a particular product, potential side effects for a particular product, instructions for use for a particular product, optimal storage conditions for a particular product, etc. Smart device 200 can also be a smart speaker or smart home device (e.g., a smart thermostat) that can provide reminders, alerts, and other information audibly. In some implementations, sensor(s) 125 can be smart sensors that can detect conditions that may affect the stability of beauty product 160 and non-transitory computer-readable instructions, when executed by processor(s) 135, can be configured to communicate with the smart home device to adjust environmental factors automatically based on the analysis of the beauty product usage information. Intelligent beauty product packaging system 100 can also receive communications/instructions from the smart speaker/smart home device (e.g., via voice commands or other inputs received by the smart/speaker/smart home device). Other types of smart devices are also possible.

Alternatively, or in addition to communicating with smart device 200, wireless transceiver 130 can be configured to communicate with a second intelligent beauty product packaging system 100A, similar to intelligent beauty product packaging system 100, and one or more memories 140 can include non-transitory computer-readable instructions that, when executed by processor(s) 135, cause processor(s) 135 to send first beauty product information regarding beauty product 160 to second intelligent beauty product packaging system 100A and receive second beauty product information from second intelligent beauty product packaging system 100A. In some implementations, a communication link can be established between intelligent beauty product packaging system 100 and second intelligent beauty product packaging system 100A via wireless transceiver 130 and beauty product information can be shared between intelligent beauty product packaging system 100 and second intelligent beauty product packaging system 100A. Based on this sharing of beauty product information, product usage notifications can be coordinated between intelligent beauty product packaging system 100 and second intelligent beauty product packaging system 100A based on collective data from intelligent beauty product packaging system 100 and second intelligent beauty product packaging system 100A. One or more memories 140 can store an interaction database 145 that contains information regarding potential interactions beauty product 160 may have with other beauty products and can include non-transitory computer-readable instructions that, when executed by processor(s) 135, cause processor(s) 135 to compare the second beauty product information received from second intelligent beauty product packaging system 100A to interaction database 145 and generate an interaction alert, which can be delivered via user interface 150 and/or sent to and delivered by smart device 200, if it is determined that there is a potential adverse reaction between the beauty product in intelligent beauty product packaging system 100 and the beauty product in second intelligent beauty product packaging system 100A.

Alternatively, or in addition to communicating with smart device 200 and/or second intelligent beauty product packaging system 100A, wireless transceiver 130 can be configured to communicate with a computing system 300 external to intelligent beauty product packaging system 100, for example, to collect additional data for improved recommendations, to synchronize information, etc. In some examples, computing system 300 may comprise one or more servers, which may comprise multiple, redundant, or replicated servers as part of a server farm. In still further examples, the server(s) may be implemented as cloud-based servers, such as a cloud-based computing platform. For example, the server(s) may be any one or more cloud-based platform(s) such as MICROSOFT AZURE, AMAZON AWS, or the like. The server(s) may include one or more processor(s) (e.g., CPUs) as well as one or more computer memories. In some implementations, computing system 300 can include a digital health record/personal fitness tracker for the user and intelligent beauty product packaging system 100 can be configured to provide recommendations/alerts, which can be delivered via user interface 150 and/or sent to and delivered by smart device 200, based on information in the digital health record/personal fitness tracker (e.g., if the digital health record indicates the user is allergic to nuts, intelligent beauty product packaging system 100 can provide an alert of potential allergic reaction if beauty product 160 contains nuts). Alternatively, or in addition, computing system 300 can be a computing system of a healthcare provider and/or the user's designated contacts and intelligent beauty product packaging system 100 can communicate information such as product usage patterns, usage anomalies, product interactions, identified concerns, suggestions for remedial action, etc. to computing system 300 and receive health and other information from computing system 300. In yet other implementations, computing system 300 can be a cloud-based storage system for data aggregation and intelligent beauty product packaging system 100 can synchronize information with computing system 300 when intelligent beauty product packaging system 100 is connected to computing system 300. In addition to synchronizing information between intelligent beauty product packaging system 100 and computing system 300, computing system 300 can also be used to remotely access intelligent beauty product packaging system 100.

Although one smart device 200, one second intelligent beauty product packaging system 100A, and one computing system 300 are shown in FIG. 2, any number of such smart devices 200, second intelligent beauty product packaging systems 100A, and computing systems 300 may be included in various embodiments. To facilitate such communications, the smart device(s) 200, second intelligent beauty product packaging system(s) 100A, and computing system(s) 300 may each respectively comprise a wireless transceiver to receive and transmit wireless communications.

In implementations that include user interface 150 in container 105, one or more memories 140 can include non-transitory computer-readable instructions that, when executed by processor(s) 135, cause processor(s) 135 to deliver the user communication to a user via user interface 150. In addition, in implementations where one or more of sensor(s) 125 are environmental sensors, non-transitory computer-readable instructions, when executed by processor(s) 135, can receive environmental information from sensor(s) 125, analyze the environmental information, and generate a user alert if the analysis of the environmental information indicates that the environmental information does not meet predefined storage and/or use conditions for beauty product 160, which can be delivered via user interface 150 and/or sent to and delivered by smart device 200.

In other examples, non-transitory computer-readable instructions can also cause processor(s) 135 to generate a user reminder based on a usage schedule for beauty product 160 and the analysis of the beauty product usage information, which can be delivered via user interface 150 and/or sent to and delivered by smart device 200. For example, if the usage schedule for beauty product 160 indicated that beauty product 160 should be applied every four hours, non-transitory computer-readable instructions can cause processor(s) 135 to generate a user reminder to apply beauty product 160 every four hours, or four hours after the last detected use of beauty product 160.

In yet other examples, non-transitory computer-readable instructions can also cause processor(s) 135 to provide one or more user instructions, guidance, support, and/or tutorials associated with beauty product 160 and/or intelligent beauty product packaging system 100, which can be delivered via user interface 150 and/or sent to and delivered by smart device 200.

Figure 3A:
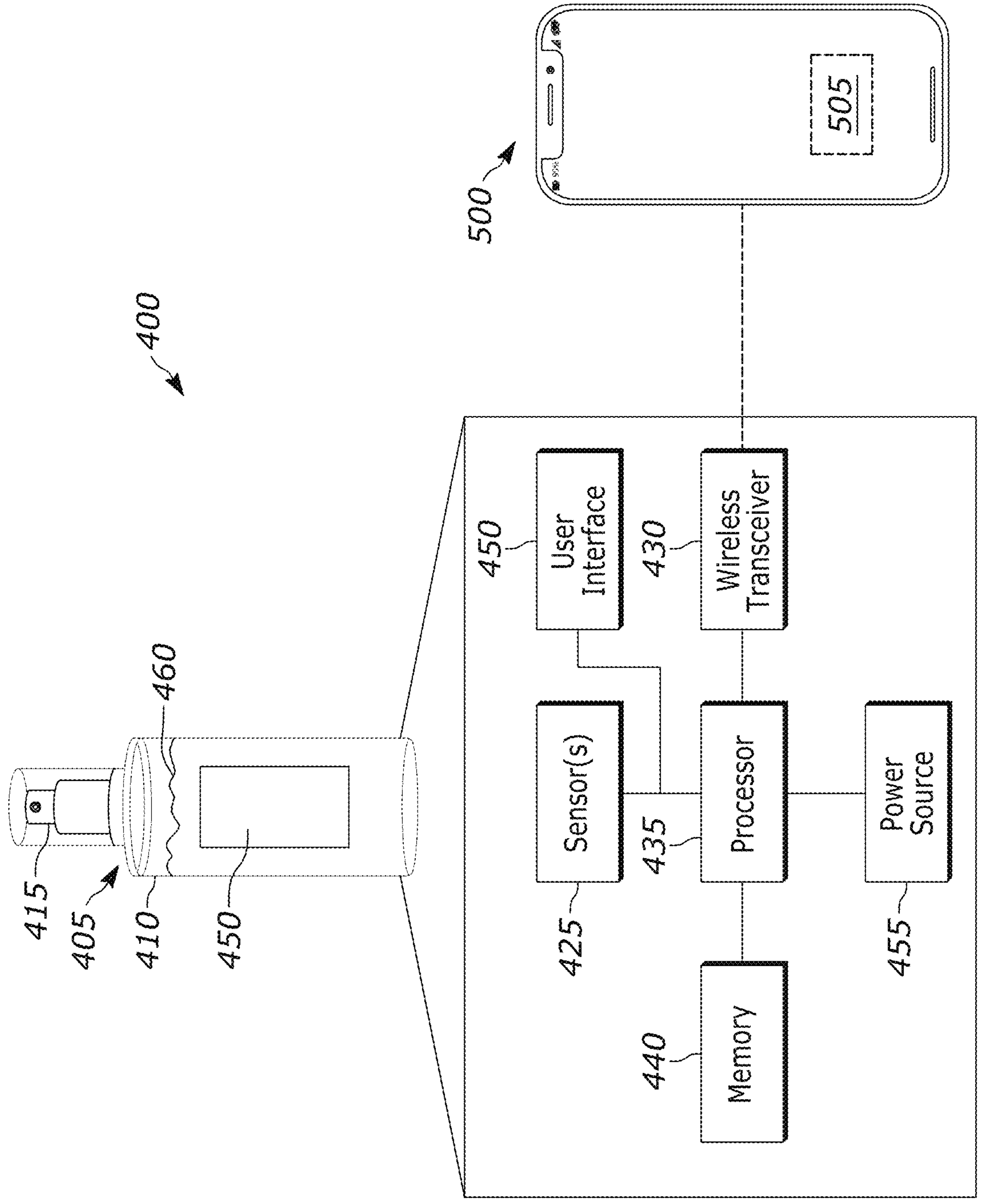
FIG. 3A illustrates a schematic view of an example container of a second example intelligent beauty product packaging system.
Figure 3B:
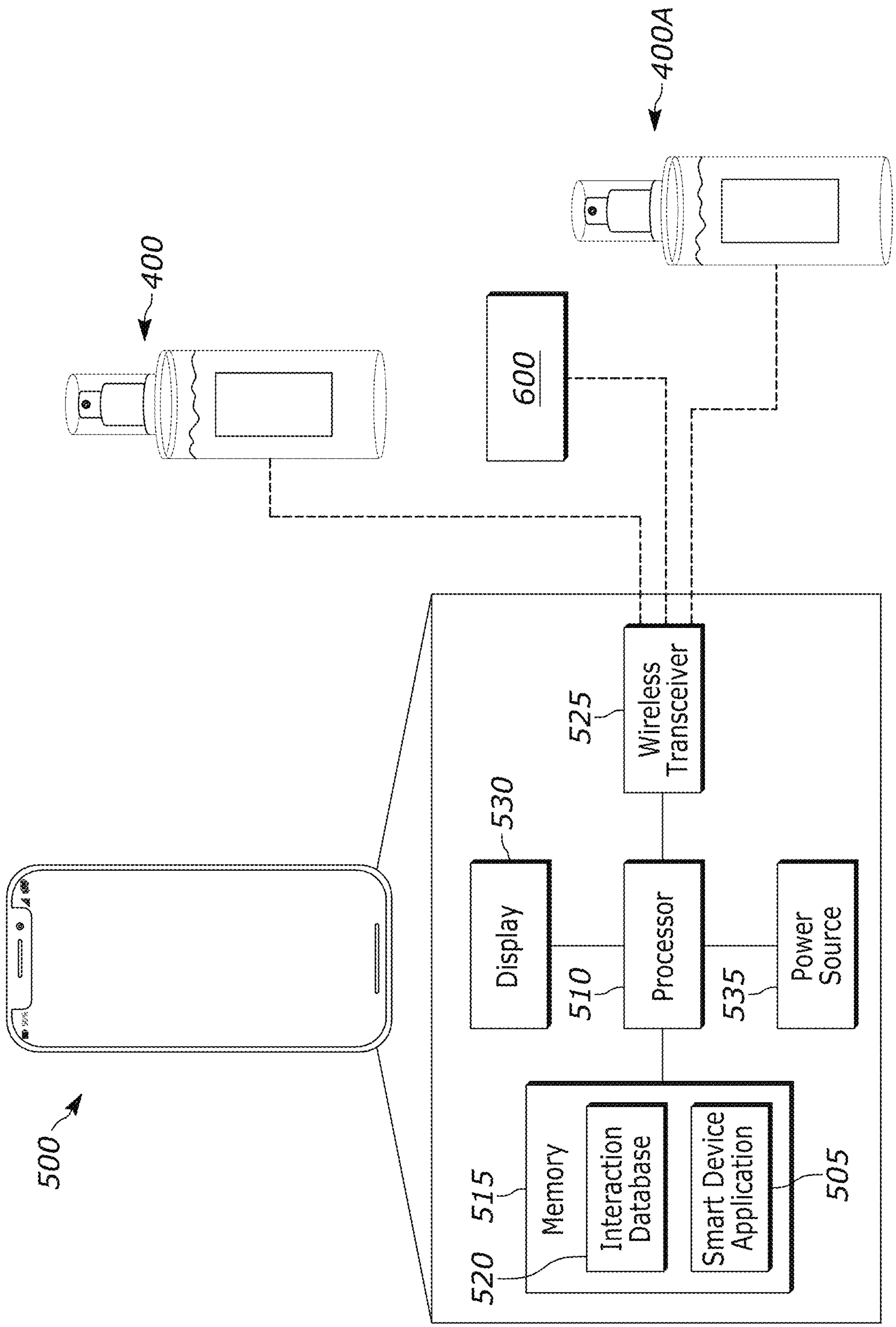
FIG. 3B illustrates a schematic view of an example smart device used with the intelligent beauty product packaging system of FIG. 3A.

Referring to FIGS. 3A and 3B, a second example intelligent beauty product packaging system 400 is illustrated, which generally includes a container 405 that is configured to contain a beauty product 460, and smart device application 505 configured to be executed by one or more processor(s) 510 of a smart device 500. Container 405 can include a housing 410 to store beauty product 460 and a dispenser 415 (e.g., an aerosol dispenser, a pump dispenser, etc.) or applicator to dispense or apply beauty product 460 and/or a lid to contain beauty product 460 within housing 410. Container 405 can be compatible with various different types of beauty products, such as liquids, creams, gels, sprays, beads, etc. In some implementations, container 405 can also include user interface 150, as discussed in detail above.

Referring to FIG. 3A, a schematic view of container 405 of intelligent beauty product packaging system 400 is illustrated, according to one implementation. The high-level architecture illustrated in FIG. 3A may include both hardware and software applications, as well as various data communications channels for communicating data between the various hardware and software components, as is described below.

Container 405 of intelligent beauty product packaging system 400 can include one or more sensors 425, one or more processors 435 communicatively coupled (e.g., via a wired or wireless connection) to sensor(s) 425, and one or more memories 440 communicatively coupled (e.g., via a wired or wireless connection) to processor(s) 435. Container 405 can also include user interface 450, a power source 455 (e.g., a battery), and a wireless transceiver 430, as discussed in more detail below.

Sensor(s) 125 can be configured to detect beauty product usage, for example, when beauty product 460 is used, an amount of beauty product 460 used, a number of times beauty product 460 has been used, etc. In some implementations, sensor(s) 425 can detect the opening/closing of the lid, the dispensing of beauty product 460 (e.g., via dispenser 415), a quantity of remaining beauty product 460 in housing 410, a time beauty product 460 was accessed/dispensed/used, etc. Other beauty product usages can also be detected by sensor(s) 425. Sensor(s) 425 can be a reed switch (e.g., to detect when the lid is opened/closed, when a pump or aerosol nozzle is depressed, etc.), a flow sensor (e.g., to detect a quantity of beauty product used and a time used), a hall effect sensor, a float switch (e.g., to detect an amount of beauty product left in the housing of the container), a gas sensor (e.g., to detect oxidation), a load cell (in the container or external of the container) (e.g., to detect when a weight of the container and beauty product has changed), etc. Other types of sensors are also possible, such as environmental sensors (e.g., temperature sensors, pressure sensors, humidity sensors, illumination sensor, etc.) configured to detect environmental information.

Wireless transceiver 430 is communicatively coupled (e.g., via a wired or wireless connection) to processor(s) 435, provides wireless communications to/from intelligent beauty product packaging system 400 (e.g., via Bluetooth, WiFi, cellular, NFC, etc.), and can include a secure data encryption protocol to ensure data privacy and safety. Wireless transceiver 430 is configured to communicate with a wireless transceiver 525 of smart device 500, which is external to container 405.

Referring to FIG. 3B, a schematic view of smart device 500 is illustrated, according to one implementation. The high-level architecture illustrated in FIG. 3B may include both hardware and software applications, as well as various data communications channels for communicating data between the various hardware and software components, as is described below.

Smart device 500 can generally include one or more processors 510, one or more memories 515 communicatively coupled (e.g., via a wired or wireless connection) to processor(s) 510, a display 530 communicatively coupled (e.g., via a wired or wireless connection) to processor(s) 510, a power source 535 (e.g., a battery), and a wireless transceiver 525, as discussed in more detail below.

Smart device application 505 can be stored in one or more memories 515 of smart device 500. One or more memories 515 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others and may store an operating system (OS) (e.g., iOS, Microsoft Windows, Linux, UNIX, etc.) capable of facilitating the functionalities, apps, methods, or other software as discussed herein.

Smart device application 505 stores non-transitory computer-readable instructions in one or more memories 515 that, when executed by processor(s) 510, cause processor(s) 510 to receive beauty product usage information from container detected by sensor(s) 425 from wireless transceiver 430 of container 405, store the beauty product usage information in one or more memories 515 of smart device

500, analyze the beauty product usage information, and generate a user communication (e.g., an alert, recommendation, reminder, information, etc.) based on the analysis of the beauty product usage information. In some implementations, the beauty product usage information detected by sensor(s) 425 and received by processor(s) 510 of smart device 500 can include a time beauty product 460 was used, an amount of beauty product 460 used, a number of times beauty product 460 and/or intelligent beauty product packaging system 400 has been used, etc. In these implementations, the analysis of the beauty product usage information by processor(s) 510 can include determining when beauty product 460 was used, if/when beauty product 460 should be used again, how much beauty product 460 was used, a quantity of beauty product 460 remaining in housing 410 of container 405, etc. In some implementations, the analysis of the beauty product usage information can forecast depletion of beauty product 160 and/or determine optimal application times for beauty product 160 based on usage patterns determined in the analysis. The user communication generated by processor(s) 510 can include a message indicating when beauty product 460 should be used again, that the quantity of beauty product 460 remaining in container 405 is less than a predetermined quantity, etc. The analysis of the beauty product usage information by processor(s) 510 can also be used to generate summary reports regarding: usage of beauty product 460 and/or intelligent beauty product packaging system 400, patterns of use of beauty product 460 and/or intelligent beauty product packaging system 400, adherence to usage recommendations, product interactions, etc. Predictive analytics can also be generated based on the analysis of the beauty product usage information. Processor(s) 510 can also monitor an expiration date for beauty product 460 and provide an alert when the expiration date is approaching or has passed.

In some implementations, processor(s) 510 can use artificial intelligence (AI) and/or machine learning (ML) algorithms to analyze the beauty product usage information, identify patterns, make predictions, etc. In addition, processor(s) 510 can use edge computing techniques to perform analysis locally on intelligent beauty product packaging system 400, reducing the need for constant network connectivity and enhancing user privacy.

In some implementations, intelligent beauty product packaging system 400 can include a locking mechanism that can prevent activation of a dispenser or opening of a lid of intelligent beauty product packaging system 400 at predetermined times. The non-transitory computer-readable instructions, when executed by processor(s) 510, can control the locking mechanism and control access to beauty product 460. For example, if beauty product 460 is to be used every four hours, the locking mechanism can be engaged upon a use of beauty product 460 and disengaged four hours after the detected use. Intelligent beauty product packaging system 400 can also alert a user or a remote third-party when the locking mechanism is disengaged and beauty product 460 becomes available for use, thereby reducing the risk of overuse or misuse and improving adherence to a prescribed regimen.

Smart device 500 can communicate the user communication to the user (e.g., visually, audibly, etc.) and the non-transitory computer-readable instructions, when executed by processor(s) 510, can cause processor(s) 510 to display the user communication on a display 530 of smart device 500 or audibly communicate the user communication through an audio device (not shown), such as a speaker. Smart device 500 can be any type of smart device, such as a smart phone, a tablet, a computer, a smart watch or fitness tracker, a virtual reality headset, smart or augmented reality glasses, wearables, etc., and display 530 can display information based on the communications with container 405 and/or general information, such as a digital user manual, ingredient list for a particular product, potential side effects for a particular product, instructions for use for a particular product, optimal storage conditions for a particular product, etc. Smart device 500 can also be a smart speaker or smart home device (e.g., a smart thermostat) that can provide reminders, alerts, and other information audibly. In some implementations, sensor(s) 425 can be smart sensors that can detect conditions that may affect the stability of beauty product 460 and non-transitory computer-readable instructions, when executed by processor(s) 510, can be configured to communicate with the smart home device to adjust environmental factors automatically based on the analysis of the beauty product usage information. Intelligent beauty product packaging system 400 can also receive communications/instructions from the smart speaker/smart home device (e.g., via voice commands or other inputs received by the smart/speaker/smart home device). Other types of smart devices are also possible.

Wireless transceiver 525 of smart device 500 can be also be configured to allow smart device application 505 to communicate with a second intelligent beauty product packaging system 400A, similar to intelligent beauty product packaging system 400, and one or more memories 515 can include non-transitory computer-readable instructions that, when executed by processor(s) 510, cause processor(s) 510 to send first beauty product information regarding beauty product 460 to second intelligent beauty product packaging system 400A and receive second beauty product information from second intelligent beauty product packaging system 400A. In some implementations, a communication link can be established between smart device 500 and second intelligent beauty product packaging system 400A via wireless transceiver 525 and beauty product information can be shared between smart device 500 and second intelligent beauty product packaging system 400A. Based on this sharing of beauty product information, product usage notifications can be coordinated between intelligent beauty product packaging system 400 and second intelligent beauty product packaging system 400A based on collective data from intelligent beauty product packaging system 400 and second intelligent beauty product packaging system 400A. One or more memories 515 can store an interaction database 520 that contains information regarding potential interactions beauty product 460 may have with other beauty products and can include non-transitory computer-readable instructions that, when executed by processor(s) 510, cause processor(s) 510 to compare the second beauty product information received from second intelligent beauty product packaging system 400A to interaction database 520 and generate an interaction alert, which can be delivered via display 530 and/or sent to and delivered by intelligent beauty product packaging system 400, if it is determined that there is a potential adverse reaction between beauty product 460 and the beauty product in second intelligent beauty product packaging system 400A.

Alternatively, or in addition to communicating with second intelligent beauty product packaging system 400A, wireless transceiver 525 can be configured to allow smart device application 505 to communicate with a computing system 600 external to intelligent beauty product packaging system 400, for example, to collect additional data for improved recommendations, to synchronize information, etc. In some examples, computing system 600 may comprise one or more servers, which may comprise multiple, redundant, or replicated servers as part of a server farm. In still further examples, the server(s) may be implemented as cloud-based servers, such as a cloud-based computing platform. For example, the server(s) may be any one or more cloud-based platform(s) such as MICROSOFT AZURE, AMAZON AWS, or the like. The server(s) may include one or more processor(s) (e.g., CPUs) as well as one or more computer memories. In some implementations, computing system 600 can include a digital health record/personal fitness tracker for the user and smart device application 505 can be configured to provide recommendations/alerts, which can be delivered via display 530 of smart device 500 and/or sent to and delivered by intelligent beauty product packaging system 400, based on information in the digital health record/personal fitness tracker (e.g., if the digital health record indicates the user is allergic to nuts, smart device application 505 can provide an alert of potential allergic reaction if beauty product 460 contains nuts). Alternatively, or in addition, computing system 600 can be a computing system of a healthcare provider and/or the user's designated contacts and smart device application 505 can communicate information such as product usage patterns, usage anomalies, product interactions, identified concerns, suggestions for remedial action, etc. to computing system 600 and receive health and other information from computing system 600. In yet other implementations, computing system 600 can be a cloud-based storage system for data aggregation and smart device application 505 can synchronize information with computing system 600 when smart device application 505 is connected to computing system 600. In addition to synchronizing information between smart device application 505 of intelligent beauty product packaging system 400 and computing system 600, computing system 600 can also be used to remotely access smart device application 505 of intelligent beauty product packaging system 400.

Although one second intelligent beauty product packaging system 400A and one computing system 600 are shown in FIG. 3B, any number of such second intelligent beauty product packaging systems 400A and/or computing systems 600 may be included in various embodiments. To facilitate such communications, the second intelligent beauty product packaging system(s) 400A and computing system(s) 600 may each respectively comprise a wireless transceiver to receive and transmit wireless communications.

In implementations that include user interface 450 in container 405, one or more memories 515 can include non-transitory computer-readable instructions that, when executed by processor(s) 510, cause processor(s) 510 to deliver the user communication to intelligent beauty product packaging system 400 for delivery to a user via user interface 450. In addition, in implementations where one or more of sensor(s) 425 are environmental sensors, non-transitory computer-readable instructions, when executed by processor(s) 510, can receive environmental information from sensor(s) 425, analyze the environmental information, and generate a user alert if the analysis of the environmental information indicates that the environmental information does not meet predefined storage and/or use conditions for beauty product 460, which can be delivered via display 530 of smart device 500 and/or sent to and delivered by intelligent beauty product packaging system 400.

In other examples, non-transitory computer-readable instructions can also cause processor(s) 510 to generate a user reminder based on a usage schedule for beauty product 460 and the analysis of the beauty product usage information, which can be delivered via display 530 of smart device 500 and/or sent to and delivered by intelligent beauty product packaging system 400. For example, if the usage schedule for beauty product 460 indicated that beauty product 460 should be applied every four hours, non-transitory computer-readable instructions can cause processor(s) 510 to generate a user reminder to apply beauty product 460 every four hours, or four hours after the last detected use of beauty product 460.

In yet other examples, non-transitory computer-readable instructions, when executed by processor(s) 510, can also cause processor(s) 510 to provide one or more user instructions, guidance, support, and/or tutorials associated with beauty product 460 and/or intelligent beauty product packaging system 400, which can be delivered via display 530 of smart device 500 and/or sent to and delivered by intelligent beauty product packaging system 400.

Furthermore, in some examples, the instructions stored on the one or more memories 140 and/or one or more memories 515 may cause the processor(s) 135, 510 to perform any or all of the steps of the method 700 discussed below with respect to FIG. 4.

In addition, one or more memories 140 and/or one or more memories 515 may also store additional machine readable instructions, including any of: one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the non-transitory computer-readable instructions stored on one or more memories 140 and/or one or more memories 515 may include instructions for carrying out any of the steps of method 700 via an algorithm executing on processor(s) 135 and/or processor(s) 510, which is described in greater detail below with respect to FIG. 4. It should be appreciated that one or more other applications may be envisioned that are executed by processor(s) 135 and/or processor(s) 510.

Figure 4:
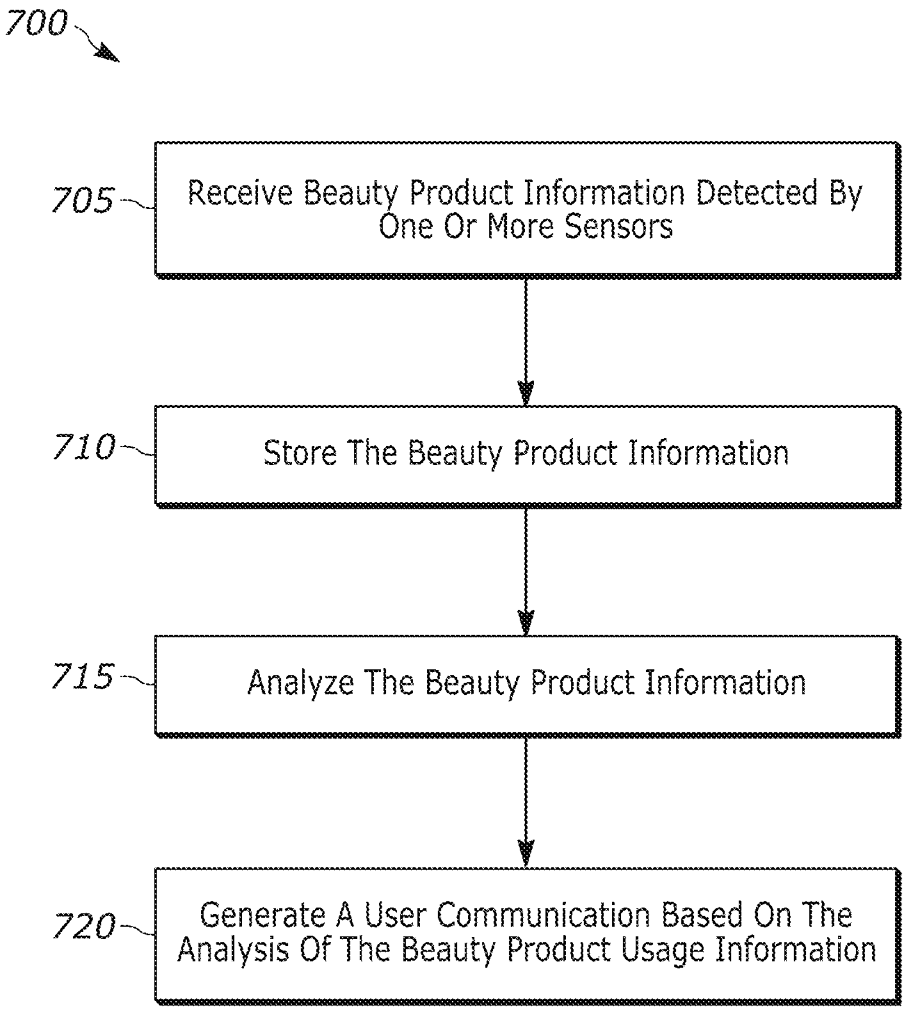
FIG. 4 depicts a flow diagram of an example computer-implemented method for operating an intelligent beauty product packaging system.

Referring to FIG. 4, a flow diagram is depicted of an example computer-implemented method 700 for operating an intelligent beauty product packaging system (e.g., intelligent beauty product packaging system 100, intelligent beauty product packaging system 400, etc.), according to one embodiment. One or more steps of method 700 may be implemented as instructions stored on a non-transitory computer-readable medium in a computer-readable memory (e.g., one or more memories 140, one or more memories 515, etc.) and executable on one or more processors (e.g., processor(s) 135, processor(s) 510, etc.).

At Step 705, the one or more processors can receive beauty product usage information that is detected by one or more sensors (e.g., sensor(s) 125, sensor(s) 425, etc.) in a container (e.g., container 105, container 405, etc.) of the intelligent beauty product packaging system. The one or more sensors can be configured to detect various types of beauty product usage, for example, when a beauty product (e.g., beauty product 160, beauty product 460, etc.) is used, an amount of the beauty product used, a number of times the beauty product has been used, etc. In some implementations, the one or more sensors can also detect the opening/closing of a lid (e.g., lid 120A, lid 120B, etc.) the dispensing of the beauty product, a quantity of remaining beauty product, a time the beauty product was accessed/dispensed/used, etc.

The one or more sensors can also be configured to detect environmental factors, such as temperature, pressure, humidity, illumination, etc.

At Step 710, the beauty product usage information received by the one or more processors can be stored in one or more memories (e.g., one or more memories 140, one or more memories 515, etc.).

At Step 715, the one or more processors can analyze the beauty product usage information. For example, the analysis of the beauty product usage information can include determining when the beauty product was used, if/when the beauty product should be used again, how much of the beauty product was used, a quantity of the beauty product remaining, etc.

At Step 720, the one or more processors can generate a user communication based on the analysis of the beauty product usage information. For example, the user communication can include a message indicating when the beauty product should be used again, that the quantity of beauty product remaining is less than a predetermined quantity, etc. In addition, the analysis of the beauty product usage information can also be used to generate summary reports regarding: usage of the beauty product and/or the intelligent beauty product packaging system, patterns of use of the beauty product and/or intelligent beauty product packaging system, adherence to usage recommendations, product interactions, etc.

In certain implementations, the user communication and/or summary reports can be communicated to the user via a user interface (e.g., user interface 150, user interface 450, etc.) of a container (e.g., container 105, container 405, etc.), via a display (e.g., display 530) of a smart device (e.g., smart device 500), etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example" or "an example" or "some examples" means that a particular element, feature, structure, or characteristic described in connection with the example is included in at least one example. The appearances of the phrase "in one example" or "in some examples" in various places in the specification are not necessarily all referring to the same example.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having," "includes", "including", "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An intelligent beauty product packaging system, comprising:

a container containing a beauty product within the container, the container comprising:

one or more sensors secured to the container and configured to detect beauty product usage, wherein: the one or more sensors comprise at least one of a reed switch, a flow sensor, a hall effect sensor, a float switch, or a load cell; and the beauty product usage comprises at least one of when the beauty product was used and/or dispensed, an amount of beauty product used and/or dispensed, a number of times the beauty product was used and/or dispensed, the opening and/or closing of a lid of the container, a quantity of the beauty product in the container, or a time the beauty product was accessed, dispensed, and/or used;

a user interface attached to or integrated into a housing of the container;

one or more processors communicatively coupled to the one or more sensors; and one or more memories communicatively coupled to the one or more processors, the one or more memories storing non-transitory computer-readable instructions that, when executed by the one or more processors, cause the one or more processors to:

receive beauty product usage information from the one or more sensors based on the beauty product usage detected by the one or more sensors;

store the beauty product usage information in the one or more memories;

analyze the beauty product usage information;

generate a user communication regarding the usage of the beauty product from the container based on the analysis of the beauty product usage information; and deliver the user communication to a user via the user interface.

2. The intelligent beauty product packaging system of claim 1, wherein the analysis of the beauty product usage information includes determining a quantity of the beauty product remaining in the container.

3. The intelligent beauty product packaging system of claim 2, wherein the user communication includes a message that the quantity of the beauty product remaining in the container is less than a predetermined quantity.

4. The intelligent beauty product packaging system of claim 1, wherein the container comprises a wireless transceiver communicatively coupled to the one or more processors.

5. The intelligent beauty product packaging system of claim 4, wherein the wireless transceiver is configured to communicate with a smart device external to the intelligent beauty product packaging system and the non-transitory computer-readable instructions, when executed by the one or more processors, cause the one or more processors to synchronize information between the intelligent beauty product packaging system and the smart device.

6. The intelligent beauty product packaging system of claim 5, wherein the non-transitory computer-readable instructions, when executed by the one or more processors, cause the one or more processors to send the user communication to the smart device.

7. The intelligent beauty product packaging system of claim 4, wherein the wireless transceiver is configured to communicate with a second intelligent beauty product packaging system and the non-transitory computer-readable instructions, when executed by the one or more processors, cause the one or more processors to send first beauty product information regarding the beauty product to the second intelligent beauty product packaging system and receive second beauty product information from the second intelligent beauty product packaging system.

8. The intelligent beauty product packaging system of claim 7, wherein the one or more memories store an interaction database and the non-transitory computer-readable instructions, when executed by the one or more processors, cause the one or more processors to compare the second beauty product information to the interaction database and generate an interaction alert if it is determined that there is a potential adverse reaction between the beauty product in the intelligent beauty product packaging system and in the second intelligent beauty product packaging system.

9. The intelligent beauty product packaging system of claim 8, wherein the non-transitory computer-readable instructions, when executed by the one or more processors, cause the one or more processors to deliver the interaction alert to a user via the user interface.

10. The intelligent beauty product packaging system of claim 8, wherein the wireless transceiver is configured to communicate with a smart device external to the intelligent beauty product packaging system and the non-transitory computer-readable instructions, when executed by the one or more processors, cause the one or more processors to send the interaction alert to the smart device.

11. The intelligent beauty product packaging system of claim 4, wherein the wireless transceiver is configured to communicate with a computing system external to the intelligent beauty product packaging system.

12. The intelligent beauty product packaging system of claim 1, wherein the one or more sensors comprises an environmental sensor and the non-transitory computer-readable instructions, when executed by the one or more processors, cause the one or more processors to receive environmental information from the environmental sensor.

13. The intelligent beauty product packaging system of claim 12, wherein the non-transitory computer-readable instructions, when executed by the one or more processors, cause the one or more processors to analyze the environmental information and to generate a user alert if the analysis of the environmental information indicates that the environmental information does not meet predefined storage and/or use conditions.

14. The intelligent beauty product packaging system of claim 13, wherein the non-transitory computer-readable instructions, when executed by the one or more processors, cause the one or more processors to deliver the user alert to a user via the user interface.

15. The intelligent beauty product packaging system of claim 1, wherein the non-transitory computer-readable instructions, when executed by the one or more processors, cause the one or more processors to generate a user reminder based on a usage schedule and the analysis of the beauty product usage information.

16. The intelligent beauty product packaging system of claim 15, wherein the non-transitory computer-readable instructions, when executed by the one or more processors, cause the one or more processors to deliver the user reminder to a user via the user interface.

17. The intelligent beauty product packaging system of claim 1, wherein the non-transitory computer-readable instructions, when executed by the one or more processors, further cause the one or more processors to provide one or more user instructions, guidance, support, and/or tutorials associated with the beauty product and/or the intelligent beauty product packaging system via a user interface of the container or via a smart device external to the container.

18. An intelligent beauty product packaging system, comprising:

a container containing a beauty product within the container, the container comprising:

one or more sensors secured to the container and configured to detect beauty product usage, wherein: the one or more sensors comprise at least one of a reed switch, a flow sensor, a hall effect sensor, a float switch, or a load cell; and the beauty product usage comprises at least one of when the beauty product was used and/or dispensed, an amount of beauty product used and/or dispensed, a number of times the beauty product was used and/or dispensed, the opening and/or closing of a lid of the container, a quantity of the beauty product in the container, or a time the beauty product was accessed, dispensed, and/or used;

a wireless transceiver configured to communicate with a smart device external to the container; and a user interface attached to or integrated into a housing of the container; and a smart device application configured to be executed by one or more processors of the smart device, the smart device application storing non-transitory computer-readable instructions in one or more memories of the smart device that, when executed by the one or more processors, cause the one or more processors to:

receive beauty product usage information detected by the one or more sensors from the wireless transceiver of the container;

store the beauty product usage information in the one or more memories of the smart device;

analyze the beauty product usage information;

generate a user communication regarding the usage of the beauty product from the container based on the analysis of the beauty product usage information; and cause the container to deliver the user communication to a user via the user interface of the container.

19. The intelligent beauty product packaging system of claim 18, wherein the non-transitory computer-readable instructions, when executed by the one or more processors, cause the one or more processors to display the user communication on a display of the smart device.

20. The intelligent beauty product packaging system of claim 18, wherein the analysis of the beauty product usage information includes determining a quantity of the beauty product remaining in the container.

21. The intelligent beauty product packaging system of claim 20, wherein the user communication includes a message that the quantity of the beauty product remaining in the container is less than a predetermined quantity.

22. The intelligent beauty product packaging system of claim 18, wherein the smart device application is configured to communicate with a second intelligent beauty product packaging system and the non-transitory computer-readable instructions, when executed by the one or more processors, cause the one or more processors receive second beauty product information from the second intelligent beauty product packaging system.

23. The intelligent beauty product packaging system of claim 22, wherein the non-transitory computer-readable instructions, when executed by the one or more processors, cause the one or more processors to compare the second beauty product information to an interaction database and generate an interaction alert if it is determined that there is a potential adverse reaction between the beauty product in the intelligent beauty product packaging system and the second intelligent beauty product packaging system.

24. The intelligent beauty product packaging system of claim 18, wherein the smart device application is configured to communicate with a computing system external to the intelligent beauty product packaging system.

25. The intelligent beauty product packaging system of claim 18, wherein the one or more sensors comprises an environmental sensor configured to detect environmental information.

26. The intelligent beauty product packaging system of claim 25, wherein the non-transitory computer-readable instructions, when executed by the one or more processors, cause the one or more processors to analyze the environmental information and to generate a user alert if the analysis of the environmental information indicates that the environmental information does not meet predefined storage and/or use conditions.

27. The intelligent beauty product packaging system of claim 18, wherein the non-transitory computer-readable instructions, when executed by the one or more processors, cause the one or more processors to generate a user reminder based on a usage schedule and the analysis of the beauty product usage information.

28. The intelligent beauty product packaging system of claim 18, wherein the non-transitory computer-readable instructions, when executed by the one or more processors, cause the one or more processors to provide one or more user instructions, guidance, support, and/or tutorials associated with the beauty product and/or the intelligent beauty product packaging system via a user interface of the smart device.

29. A computer-implemented method for operating an intelligent beauty product packaging system, the method comprising:

receiving, by one or more processors, beauty product usage information from one or more sensors secured to a container of the intelligent beauty product packaging system, the container comprising a user interface attached to or integrated into a housing of the container, wherein: the one or more sensors comprise at least one of a reed switch, a flow sensor, a hall effect sensor, a float switch, or a load cell; and the beauty product usage information comprises at least one of a time the beauty product was accessed, dispensed, and/or used, an amount of the beauty product that was used and/or dispensed, a number of times the beauty product and/or the intelligent beauty product packaging system was accessed, dispensed, and/or used, or a quantity of the beauty product in the container;

storing the beauty product usage information in one or more memories;

analyzing, by the one or more processors, the beauty product usage information;

generating, by the one or more processors, a user communication regarding the usage of the beauty product from the container based on the analysis of the beauty product usage information; and delivering, by the one or more processors, the user communication to a user via the user interface.

30. A non-transitory computer-readable medium storing instructions for operating an intelligent beauty product packaging system that, when executed by one or more processors, cause the one or more processors to perform a method comprising:

receiving, by the one or more processors, beauty product usage information from one or more sensors secured to a container of the intelligent beauty product packaging system, the container comprising a user interface attached to or integrated into a housing of the container, wherein: the one or more sensors comprise at least one of a reed switch, a flow sensor, a hall effect sensor, a float switch, or a load cell; and the beauty product usage information comprises at least one of a time the beauty product was accessed, dispensed, and/or used, an amount of the beauty product that was used and/or dispensed, a number of times the beauty product and/or the intelligent beauty product packaging system was accessed, dispensed, and/or used, or a quantity of the beauty product in the container;

storing the beauty product usage information in one or more memories;

analyzing, by the one or more processors, the beauty product usage information;

generating, by the one or more processors, a user communication regarding the usage of the beauty product from the container based on the analysis of the beauty product usage information; and delivering, by the one or more processors, the user communication to a user via the user interface.

* * * * *